US005481909A

United States Patent [19]
Deutsch et al.

[11] Patent Number: 5,481,909
[45] Date of Patent: Jan. 9, 1996

[54] APPARATUS AND METHOD FOR MEASURING RECIPROCATING ENGINE PERFORMANCE DEPENDENT ON POSITIONAL BEHAVIOR OF A MEMBER DRIVEN BY ENGINE TORQUE

[75] Inventors: Robert W. Deutsch, Sugar Grove; Scott A. Robb, Buffalo Grove, both of Ill.

[73] Assignee: Motorola, Inc., Schaumburg, Ill.

[21] Appl. No.: 206,584

[22] Filed: Mar. 7, 1994

[51] Int. Cl.⁶ .................................................. G01M 15/00
[52] U.S. Cl. .................... 73/117.3; 123/419; 123/436; 364/431.07
[58] Field of Search ................................. 73/116, 117.3; 364/431.07, 431.08; 123/419, 436

[56] References Cited

U.S. PATENT DOCUMENTS

| | | |
|---|---|---|
| 4,292,670 | 9/1981 | Reid et al. |
| 4,295,363 | 10/1981 | Buck et al. |
| 4,380,800 | 4/1983 | Wilkinson ........................ 123/436 |
| 4,553,426 | 11/1985 | Capurka ............................ 73/116 |
| 4,691,288 | 9/1987 | Kay et al. ......................... 73/116 |
| 4,814,704 | 3/1989 | Zerrien et al. |
| 4,932,379 | 6/1990 | Tang et al. |
| 4,936,277 | 6/1990 | Deutsch et al. ................. 123/436 |
| 4,941,445 | 7/1990 | Deutsch |
| 5,041,979 | 8/1991 | Hirka et al. .................... 73/116 |
| 5,095,742 | 3/1992 | James et al. |
| 5,197,325 | 3/1993 | Tamura et al. ................ 73/117.3 |
| 5,200,899 | 4/1993 | Ribbens et al. ................ 73/116 |
| 5,245,865 | 9/1993 | Kayanuma ..................... 73/117.3 |
| 5,245,866 | 9/1993 | Hashiguchi et al. ............ 73/117.3 |
| 5,287,736 | 2/1994 | Nakayama et al. ............. 73/116 |

OTHER PUBLICATIONS

Diagnosis of Individual Cylinder Misfires by Signature Analysis of Crankshaft Speed Fluctuations; G. Rizzoni, University of Michigan Copyright 1989 Society of Automotive Engineers, Inc. 890884.

Simplified Flywheel Speed Fluctuation Monitoring and Control; Motorola, Inc. Technical Developments vol. 12 Apr. 1991.

*Primary Examiner*—Richard Chilcot
*Assistant Examiner*—Eric S. McCall
*Attorney, Agent, or Firm*—Nicholas C. Hopman

[57] ABSTRACT

An apparatus, and a corresponding method, measures reciprocating engine performance based on torque output of the engine. This is accomplished by observing positional behavior of a rotating member driven by the engine. The apparatus includes a measurement device (129) that provides an acceleration signal (116) indicative of acceleration of the rotating member (101). A gated ACCEL-DECEL device (126) provides a gated acceleration signal (141), dependent on the acceleration signal (116) gated by an accumulate enable flag (138) corresponding to a first span (120) of rotary position of the rotating member (101). An accumulation device (143) accumulates the gated acceleration signal (141), and provides an accumulated result (149) dependent thereon. This accumulated result is a variable indicative of the reciprocating engine's performance.

44 Claims, 4 Drawing Sheets

APPARATUS AND METHOD FOR MEASURING RECIPROCATING ENGINE PERFORMANCE DEPENDENT ON POSITIONAL BEHAVIOR OF A MEMBER DRIVEN BY ENGINE TORQUE

FIELD OF THE INVENTION

This invention is generally directed to the field of measuring performance of a reciprocating engine, and specifically for measuring performance of a reciprocating engine by monitoring the positional behavior of a member for changes in torque produced.

BACKGROUND OF THE INVENTION

Certain prior art schemes measure positional behavior of a rotating member to determine engine performance. Performance metrics often include a measure of combustion performance. This performance may include knock determination compression performance, and misfire detection.

A certain problem with these prior art schemes is that they are complex in form. Specifically, some prior art approaches measure positional behavior of a rotating member by using a counter system as a front end to a microcontroller Arithemetic Logic Unit (ALU). The counter system responds to a speed signal provided by a Hall-effect sensor sensing alternating spaces and marks on a toothed flywheel driven by the engine. By monitoring an output of the counter system, which is indicative of engine speed, the ALU can perform deterministic procedures to compare relative multi-toothed wheel positional behavior performance within partial combustion cycles, over multiple combustion cycles, and also over adjacent cylinder combustion cycles. These deterministic procedures can provide an indication of engine performance. Since these deterministic procedures-thus method steps are indigenous in the architecture of this prior an approach, and the multi-toothed wheel changes position at a very high speed, the computational overhead for the ALU, and utilization of other microcontroller related resources such as Read Only Memory (ROM), Random Access Memory (RAM), counter structures etc. is substantial. An issued patent entitled "SYSTEM FOR MONITORING AND/OR CONTROLLING MULTIPLE CYLINDER ENGINE PERFORMANCE", authored by Deutsch et al. on Jun. 26, 1990, Ser. No. 4,936,277 is an example of such a structure. Often the microcontroller is burdened with other tasks, but because of the resource intensive nature of this prior an approach, larger more complex architectures must be provided. This not only requires more components and potentially higher performance ALU's etc. but also adds to system complexity and cost.

Other prior an schemes have recognized this problem and have tried to reduce further the amount of processing required by the microprocessor by selectively gating period information to the microprocessor. A Simplified Flywheel Speed Fluctuation Monitoring and Control; authorde by Robert W. Deutsch; published in the Motorola, Inc. Technical Developments Volume Apr. 12, 1991 is an example of this. However, this period information still requires significant processing power to convert to acceleration information and to obtain performance information.

Still other prior art schemes use digital signal processing of the positional behavior of a rotating member to determine engine performance. These systems are also very complex and resource intensive. Typically, the positional behavior of the multi-toothed wheel is convened from its analog form to a digital representation and then digital signal processing method steps are executed to determine engine performance. Again, this approach is very costly, complex, and resource intensive.

What is needed is an improved system and method for measuring reciprocating engine performance dependent on positional behavior of a rotating member driven by the engine, that is less complex, requires less ALU computational overhead, and is less costly.

DETAILED DESCRIPTION OF A PREFERRED EMBODIMENT

An apparatus, and a corresponding method, measures reciprocating engine performance based on torque output of the engine. This is accomplished by observing positional behavior of a rotating member driven by the engine. The apparatus includes a measurement device that provides an acceleration signal indicative of acceleration of the rotating member. A gated ACCEL-DECEL device provides a gated acceleration signal, dependent on the acceleration signal gated by an accumulate enable flag corresponding to a first span of rotary position of the rotating member. An accumulation device accumulates the gated acceleration signal, and provides an accumulated result dependent thereon. This accumulated result is a variable indicative of the reciprocating engine's performance.

The gating mechanism, gated ACCEL-DECEL device, allows the accumulation device to consider only relevant portions of the flywheel's positional behavior. The system designer determines which portions are relevant based on engine metrics, and for which cylinder, or cylinder's, he is interested. As mentioned in the background section this may include, but is not limited to, knock determination, compression performance, and misfire detection.

Optionally, a sign flag is provided corresponding to the first span and a second span of rotary position of the rotating member. This sign flag can be used to accumulate a difference in transitions of the gated acceleration signal when the direction of acceleration of the rotating member during the first span and second span is identical. This can be the case if the affect of the engine's torque is being interpreted between cylinders in a same portion of the combustion cycle. This is also the case when comparing more than one combustion cycle for the same cylinder.

The described apparatus enables the system designer to easily program the absolute-and relative position of the first span and optionally the direction of accumulation so as to determine engine performance based on these variables. Additionally, a more spans, commencing with the above-mentioned second span can be programmed into an apparatus shown in FIG. 1 for more complex engine performance analysis. Additional details of programming multiple spans will be described below. A distinct feature of this approach is the off-loading of an engine microcontroller's principal ALU from processing the acceleration and deceleration information in real time.

Before discussing specific applications, component parts of the apparatus will be introduced and detailed.

Figure 1:
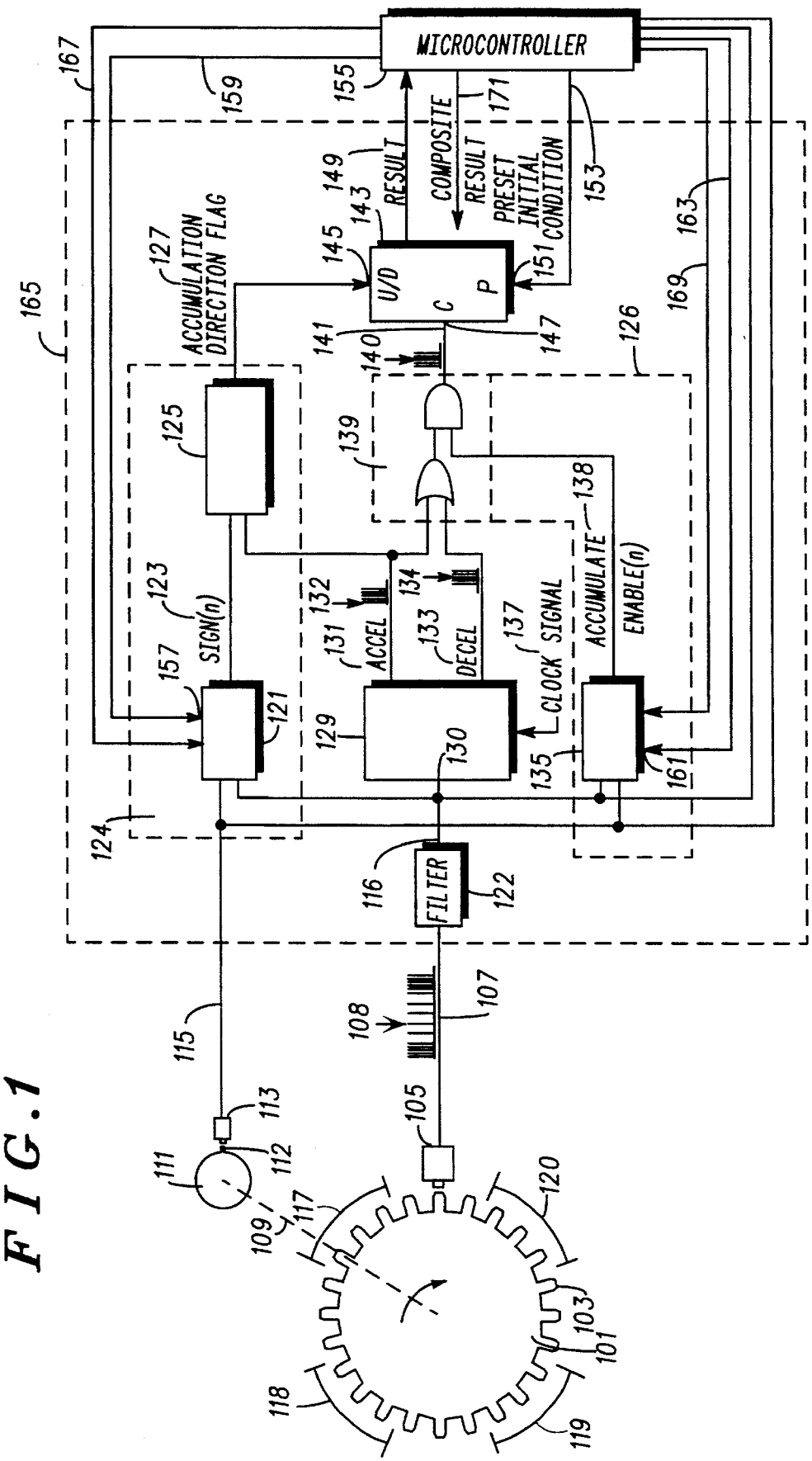
FIG. 1 is a block diagram illustrating an apparatus for measuring reciprocating engine performance dependent on positional behavior of a rotating member, in accordance with a preferred embodiment of the invention.

In FIG. 1 a multi-toothed wheel 101 is coupled to a reciprocating engine. This multi-toothed wheel 101 represents the above-mentioned rotating member. Although the rotating member driven by the reciprocating engine need not be a multi-toothed wheel, this is a common form of apparatus known to those skilled in engine design. The multi-toothed wheel 101, typically has a multitude of teeth 103, positioned along a circumferential outer surface. In the preferred embodiment the multi-toothed wheel 101 has 24 teeth. Other tooth configurations are also usable. As the rotational position of the multi-toothed wheel 101 changes, dependent on engine torque produced by the reciprocating engine, a positional encoder, here a Hall-effect pickup 105, will output a signal 107 indicative of this changing rotational position. Note that reference number 108 illustrates transition of the signal 107 corresponding to the passing of the individual teeth of the multi-toothed wheel 101. Additionally, a camshaft structure 111 is mechanically coupled 109 to the multi-toothed wheel 101. This coupling 109 causes the camshaft structure 111 to rotate 360° for every 720° of rotation of the multi-toothed wheel 101. Present on the camshaft structure 111 is a singular tooth 112 that can be used to measure a top-dead-center (TDC) position of a pre-determined cylinder of the reciprocating engine. This is useful in contemporary engines for synchronizing engine operation. Another Hall-effect pickup 113 will output a signal 115 indicative of this TDC position. This above-represented structure is common in most contemporary reciprocating engine designs, and is typically used to establish ignition and fueling sequences. Additionally, this engine rotational position measurement structure can be used to measure engine performance.

Although a specific measurement apparatus has been described above, other measurement apparatus that indicate torque output of the engine, may also be used in its place. For example, the Hall-effect sensors 105 and 113 can be replaced by optical or variable reluctance type sensors. The multi-toothed wheel could provide the TDC information now derivable by the two sensors 105 and 113, by means of a missing or irregular tooth and missing or irregular tooth detection circuitry. Also, in the case of a two-stroke engine, the camshaft structure 111 may not be needed, and a missing tooth and missing tooth detection circuitry could also provide the TDC of a predetermined cylinder. Next, the remaining elements of FIG. 1 will be introduced and detailed.

A filter 122 is provided to eliminated unwanted components of the signal 107. This filter may be an analog filter, or a digital filter. This filter 122 may also be programmed by a microcontroller 155 to eliminate specific unwanted components of the signal 107. The filter 122 outputs a filtered signal 116.

Preferably, the microcontroller used here is a Motorola MC68332 device. Optionally, other microcontrollers can be used in its place.

A measurement device, here an ACCEL-DECEL circuit 129, provides an ACCEL signal 131 and a DECEL signal 133, both signals dependent on the filtered signal 116 provided from the filter 122 to an input 130. Transitions 132 of the ACCEL signal 13 1 are indicative of acceleration of the multi-toothed wheel 101, and transitions 134 of the DECEL signal 133 are indicative of deceleration of the multi-toothed wheel 101.

Preferably, the measurement device 129 is comprised of a digital rate multiplier, and an angle counter which is monitored on a tooth by tooth basis to synchronize the angle count, indigenous to the angle counter, with engine rotation and a correction circuit which corrects the angle count every tooth of the multi-toothed wheel 101 for errors due to acceleration and deceleration. At every tooth the measurement device 129 can generate either the ACCEL signal 131 or the DECEL signal 133 which are used to resynchronize the angle counter and are also output for further processing.

The digital rate multiplier multiplies the filtered signal 116 by a fixed amount (for example 16). The output of the digital rate multiplies is corrected at the beginning of each tooth of the multi-toothed wheel 101 based on the previous tooth's period. The angle counter counts the multiplied signal. During periods of acceleration, the angle counter will not reach multiplier value (16) before the next tooth occurs. In this case the angle counter is counted up very quickly to the multiplier value by means of a clock signal 137. The clock signal 137 used to count up the angle counter is also output to the gating circuit 139 by means of the ACCEL signal 131. In the case of deceleration, the angle counter reaches the multiplier value (16) before the next tooth occurs. In this case, the counter is prevented from counting and is considered stalled. During the period the output of the digital rate multiplier is provided to a gating circuit 139 by means of the DECEL signal 133.

The clock signal 137 is an accurate high frequency signal preferably derived from a clock source driving the microcontroller 155.

While the above description is believed to be a sufficient description of the ACCEL 131 and DECEL 133 signal generation, additional details can be found in the following U.S. Patents which are incorporated herein by reference U.S. Pat. No. 4,814,704 authored by Zerrien, Jr. et al., entitled ROTOR POSITION INDICATOR WITH CORRECTION FOR APPARENT ACCELERATION AND DECELERATION, issued on Mar. 21, 1989, and U.S. Pat. No. 5,041,979 authored by Hirka et al., entitled BOUNDED SYNCHRONOUS ANGLE COUNTER, issued on Aug. 20, 1991.

Also, although the above description of the ACCEL-DECEL circuit and associated generation of ACCEL 131 and DECEL 133 signals is the preferred structure, given the above teaching it would be obvious to those skilled in the art that another structure providing acceleration and deceleration pulses generated for every tooth of the multi-toothed wheel could provide the necessary input to gating circuit 139.

Next, an accumulation direction means 124 is comprised of a sign circuit 121 and a combining circuit 125. This accumulation direction means 124 exists to enable the system designer to add and subtract acceleration information from various spans on the multi-toothed wheel 101 . The output of the accumulation direction means 124 is an accumulation direction flag 127.

As the toothed-wheel 101 rotates—driven by engine produced torque, a sign device 121 provides a sign flag 123, SIGN(n), associated with each tooth of the multi-toothed wheel 101. The sign flag 123, SIGN(n) is programmed by the microcontroller 155 using data path 159 to a first or a second logical state for each tooth of the multi-toothed wheel 101. For instance, in cooperation with a below-described combining circuit 125, if the sign flag 123, SIGN(n) is programmed to the first logical state, this sign flag 123 forces an accumulation device 143 to accumulate in a positive direction, when the multi-toothed wheel 101 is accelerating. Conversely, when the multi-toothed wheel 101 is decelerating and the sign flag 123, SIGN(n) is programmed to the first logical state, this sign flag 123 forces the accumulation device 143 to accumulate in a negative direction. Also, if the sign flag 123, SIGN(n) is programmed to the second logical state, this sign flag 123 forces the accumulation device 143 to accumulate in a negative direction if the multi-toothed wheel 101 is accelerating. And, if the sign flag 123, SIGN(n) is programmed to the second logical state, this sign flag 123 forces the accumulation device 143 to accumulate in a positive direction if the multi-toothed wheel 101 is decelerating. As mentioned above, this flexible-programmable structure enables the system designer to add and subtract acceleration information from various spans on the multitoothed wheel 101. For a more detailed understanding of a preferred sign circuit please refer to FIG. 4.

Figure 4:
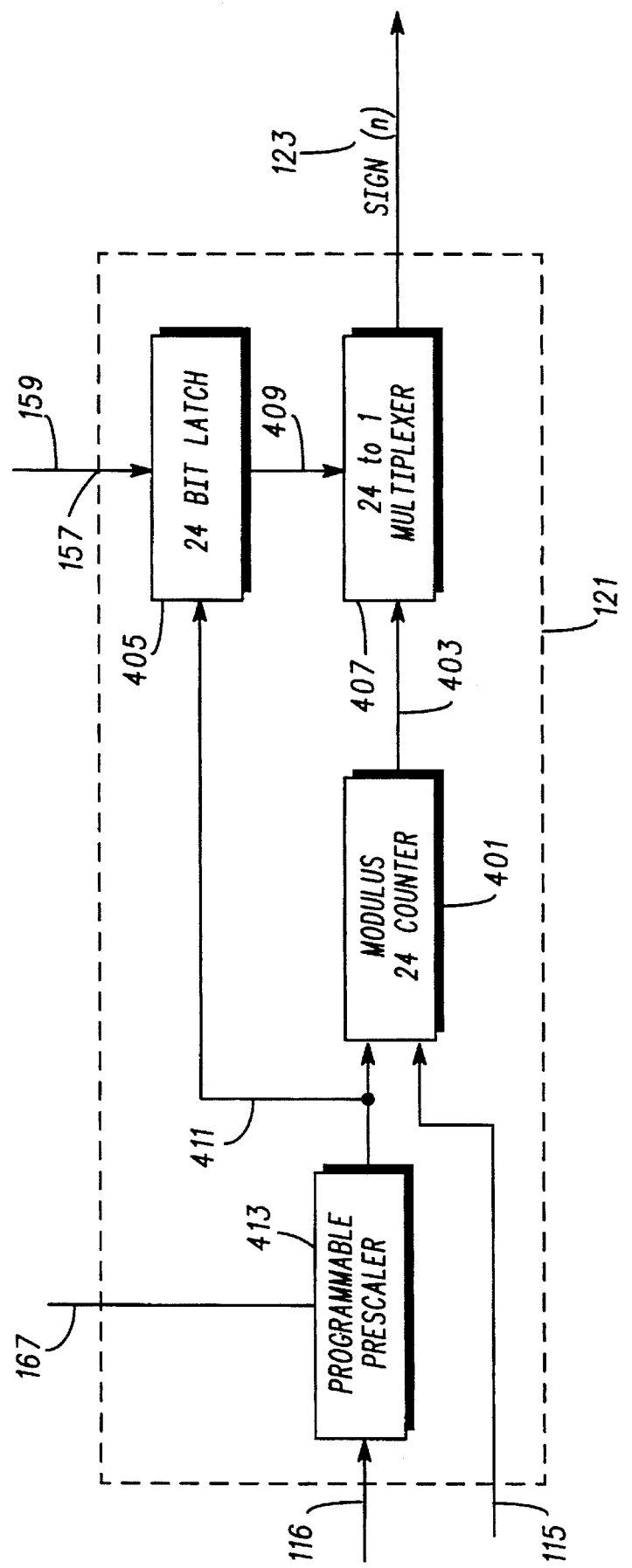
FIG. 4 is a system block diagram showing details of an apparatus shown in FIG. 1.

FIG. 4 includes a modulus 24 counter 401, coupled to a 24 to 1 multiplexer 407, driven by a 24 bit latch 405. All of these elements 40 1, 407, and 405 are 24 bits in size because the multi-toothed wheel 101 has 24 teeth. Given a different tooth count on the multi-toothed wheel 101, these elements would be of a size corresponding to the different tooth count.

In operation the 24 bit latch receives a sign flag 123, SIGN(n), at an input 157 from the microcontroller 155 using data path 159, corresponding to each of the 24 teeth of the multi-toothed wheel 101. Note that the above-mentioned variable (n) corresponds to a bit position in the 24 bit structure. The sign flags received from the microcontroller 155, can be associated with the one or more spans mentioned above. An example of this will be detailed later in reference to a working example. Once operating, the modulus 24 counter 401 generates an address pattern 403 that, in cooperation with the 24 to 1 multiplexer 407, sequentially addresses successive bit positions in the 24 bit latch 405 that correspond to the individual teeth of the multi-toothed wheel 101. The modulus 24 counter 401 is periodically synchronized to an absolute position of the multi-toothed wheel 101 by the signal 115 indicative of TDC. The modulus 24 counter 401 counts teeth using the filtered signal 116 which represents the changing position of the multi-toothed wheel 101. The purpose of this just-described structure is to program a sign bit to each tooth and, responsive to movement of the multi-toothed wheel 101, provide a sign flag corresponding to the programmed flag when the appropriate tooth is sensed by the sensor 105. This structure allows very resolute and flexible span programmability.

Optionally, a programmable prescaler 413 can be used to map multiple teeth into the 24 bit mechanism 401, 405, and 407. This is useful for applications that have a large number of teeth on the multitoothed wheel to process. This may be the case in some engine systems where a high number of teeth are necessary for another purpose—such as precise angle-based ignition control. In these type of systems it is not uncommon to have 36 or more teeth. Since some engine performance measurements may not require the resolution that this many teeth allow, the programmable prescaler 413 can be used to reduce the granularity of the filtered signal 116 provided associated with the multi-toothed wheel 101. For instance, if a resolution of 15° is required, and the multi-toothed wheel 101 has 48 teeth, the programmable prescaler 413 can scale the incoming filtered signal 116 by 2. Therefore, by matching the apparatus 401, 405, and 407 size to the required resolution, system size and cost can be effectively managed.

Returning to FIG. 1, the combining circuit 125 provides the abovementioned accumulation direction flag 127 dependent on both the sign flag 123 and transitions 132, 134 of one of the ACCEL signal 131 and the DECEL signal 133. In FIG. 1 the ACCEL signal 131 is used, however the DECEL signal 133 can be interchanged with minor modification to the combining circuit 125.

The purpose of the combining circuit 125 is to selectively invert or not invert transitions 132, 134 of one of the ACCEL and the DECEL signals 131, 133 dependent on the logical state of the sign flag 123, SIGN(n). In the preferred embodiment, the combining circuit 125 consists of an exclusive NOR gate.

Although the above describes the use of the transitions 132, 134 of the ACCEL 131 and DECEL 133 signals combined with the sign flag 123, SIGN(n) to control the direction of accumulation in an accumulation circuit 143, any circuit which is capable of reversing the effect of the ACCEL and DECEL transitions 132, 134 on the accumulation circuit 143 based on the programmed state of sign flag 123, SIGN(n), would accomplish this same purpose. Also as mentioned in the detailed description if the sign(n) flag is not used the accumulation direction flag is dependent on the direction of acceleration of the rotating member.

An accumulate enable circuit 135 enables the system designer to specify which of one or more spans of acceleration information from the multi-toothed wheel 101 will be considered by the accumulation circuit 143. The accumulate enable circuit 135 provides an accumulate enable flag 138, ACCUMULATE ENABLE (n) associated with an absolute position of each tooth of the multitude of teeth 103 of the multi-toothed wheel 101. The accumulate enable flag 138 is programmed using a similar structure to that described above for the sign circuit 121. Once programmed the accumulate enable flag 138 essentially defines the spans of interest. A working example of this will be described below. Preferably, the accumulate enable circuit 135 is constructed of the same architecture as the sign circuit 121 illustrated in FIG. 4. An input 161 of the accumulate enable circuit 135 corresponds to the input 157 of the sign circuit 157. At the appropriate time the input 161 receives an accumulate enable pattern, characterized by either a first or a second logical state corresponding to each tooth of the multi-toothed wheel 101, from the microcontroller 155 using data path 169.

If the accumulate enable flag 138, ACCUMULATE ENABLE (n) is programmed to a first state then the tooth associated with the accumulate enable flag 138 is considered to be positioned within a programmed span. Note that the programmed spans need not be comprised of contiguously programmed accumulate enable flag's. For instance, the system designer may be motivated to program a non-contiguous span of accumulate enable flag's associated with the multi-toothed wheel's teeth if a known disturbance—such as an identifiable engine drive-train perturbation exists that may adversely affect the measurement at hand. In this case the system designer may choose to select an accumulate enable flag pattern of 5 teeth—skip 2 teeth and continue with 3 teeth.

. The accumulate enable flag 138, ACCUMULATE ENABLE (n) is used by the gate circuit 139, for deriving a gated ACCEL-DECEL signal 141 having accumulation transitions 140 dependent on the transitions 132 of the ACCEL signal 131 and the transitions 134 of the DECEL signal. If the accumulate enable flag 138, ACCUMULATE ENABLE (n) for the present tooth of the multi-toothed wheel produces a first logical state and either transitions 132 of the ACCEL signal 131 or the transitions 134 of the DECEL signal 133, are presented to the gating circuit, then the gated ACCEL-DECEL signal 141 is produced for use by the above-mentioned accumulation circuit 143.

Conversely, if the accumulate enable flag 138, ACCUMULATE ENABLE (n) for the present tooth of the multi-toothed wheel produces a second logical state and either transitions 132 of the ACCEL signal 131 or the transitions 134 of the DECEL signal 133, are presented to the gating circuit, then the gating circuit 139 prevents the provision of the accumulation transitions 140 associated with the transitions 132 of the ACCEL signal 131 and the transitions 134 of the DECEL signal 133, to the accumulation circuit 143.

The accumulation circuit 143 cumulates the ACCEL 131 and DECEL 133 signals provided by the measurement circuit 129 based on the sign flag 123, SIGN(n), and the accumulate enable flag 138, ACCUMULATE ENABLE (n), and provides a result 149 dependent on these signals. Note that the accumulation circuit 143 also has an input 151 for receiving an initial condition 153 provided from the microcontroller 155. This enables the accumulation circuit 143 to be preset to a particular value before the accumulation process occurs. This can be helpful if there is any question as to whether or not the accumulation circuit 143 may overflow or underflow its range—or span. In this case, the initial condition can be preset to a value median within the span of the accumulation circuit 143. For instance, if the accumulation circuit 143 comprises an 8 bit counter the median value would be 128.

Figure 3:
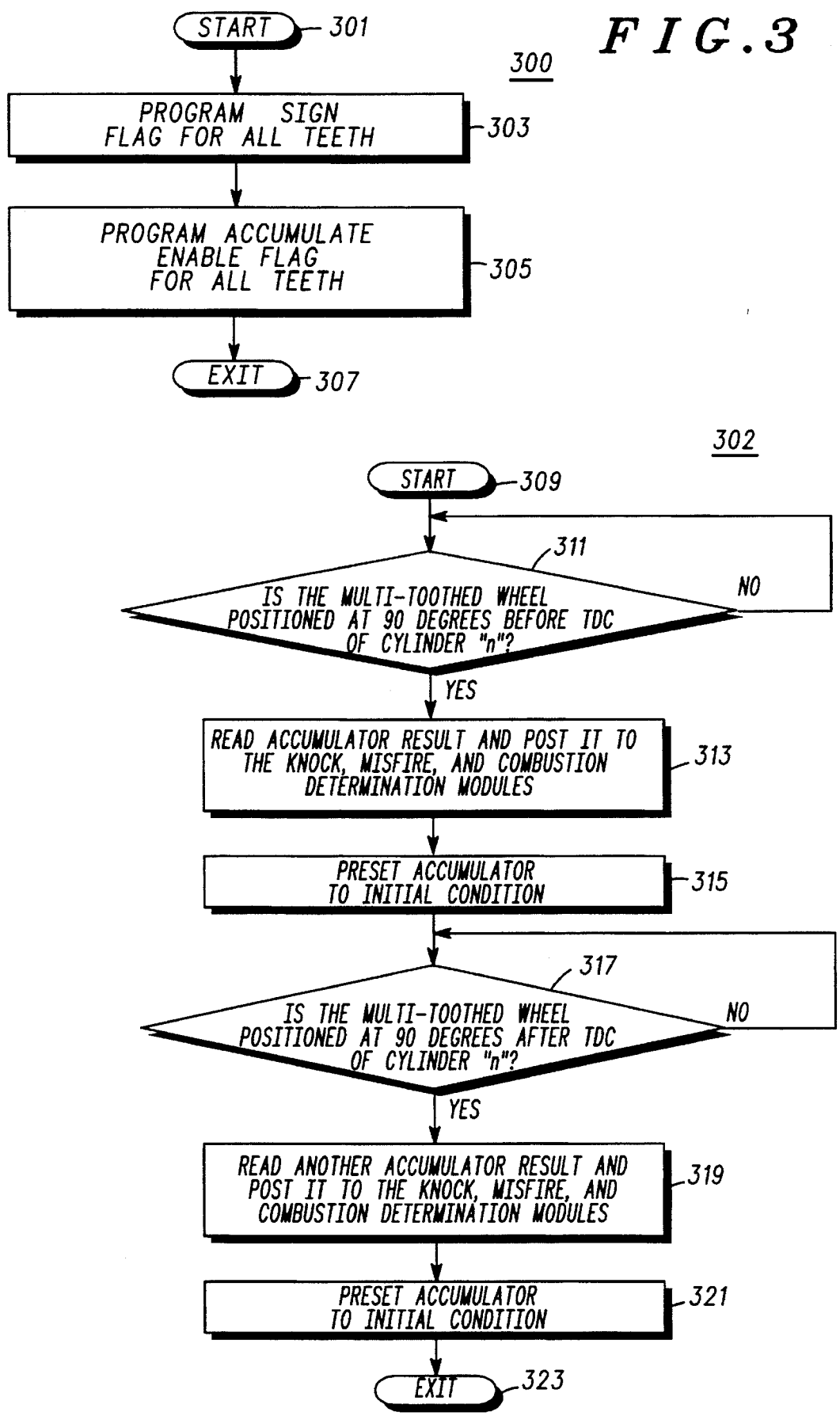
FIG. 3 includes flow charts for illustrating a preferred method of applying the apparatus shown in FIG. 1.

Next, in FIG. 3 an example of the programming of the apparatus shown in FIG. 1 will be described. FIG. 3 shows a flow chaff representing several method steps encoded into firmware and executing on the microcontroller 155. In step 301 an initialization routine 300 is entered.

Next, in step 303 the 24 bit latch 405 indigenous to the sign circuit 121 is programmed with a pattern corresponding to a desired sign flag associated with an absolute position of each tooth of the multitude of teeth of the multi-toothed wheel. Note, as described above, this sign flag pattern defines the action of the accumulation device 143 for each tooth of the multi-toothed wheel 101.

Then, in step 305 the accumulate enable device 135 is programmed with a pattern corresponding to a desired accumulate enable flag associated with an absolute position of each tooth of the multitude of teeth of the multi-toothed wheel. Note, as described above, this accumulate enable flag pattern defines the spans over which the accumulation device 143 will be operative.

Next, in step 307 the routine 300 is exited. This routine 300 is executed each time the microcontroller 155 is initialized and whenever a re-programming of the sign and enable flag patterns is desired.

Another routine 302 is continuously executing in the microcontroller 155. Its purpose is to measure the engine's performance on a regular schedule. This is one of may possible methods useful to execute given the apparatus shown in FIG. 1. In step 309 the routine is entered.

Next, in step 311 the microcontroller 155 determines when the multi-toothed wheel 101 is positioned a 90° before TDC of a particular cylinder. The microcontroller 155 can determine the multi-toothed wheel's 101 position by monitoring the signals 115 and 116. When the multi-toothed wheel 101 is positioned 90° before TDC of a particular cylinder step 313 is executed.

In step 313 the result from the accumulation circuit 143 is read and posted to external knock, misfire, and combustion determination modules.

Then, in step 315 the accumulation circuit 143 is preset to an initial condition 153 via the input 151.

Next, in step 317 the microcontroller 155 determines when the multi-toothed wheel 101 is positioned a 90° after TDC of the particular cylinder. When the multi-toothed wheel 101 is positioned 90° after TDC of a particular cylinder step 319 is executed.

In step 319 another result from the accumulation circuit 143 is read and posted to external knock, misfire, and combustion determination modules. The knock, misfire, and combustion determination modules can use both the result and the another result to interpret engine performance.

Then, in step 321 the accumulation circuit 143 is again preset to the initial condition 153 via the input 151.

Finally, in step 323 the routine 302 is exited. This routine 302 can be repetitively executed to repetitively interpret the running performance of the engine.

Now that the essential apparatus and programming mechanisms have been detailed, a working example will be described next.

Figure 2:
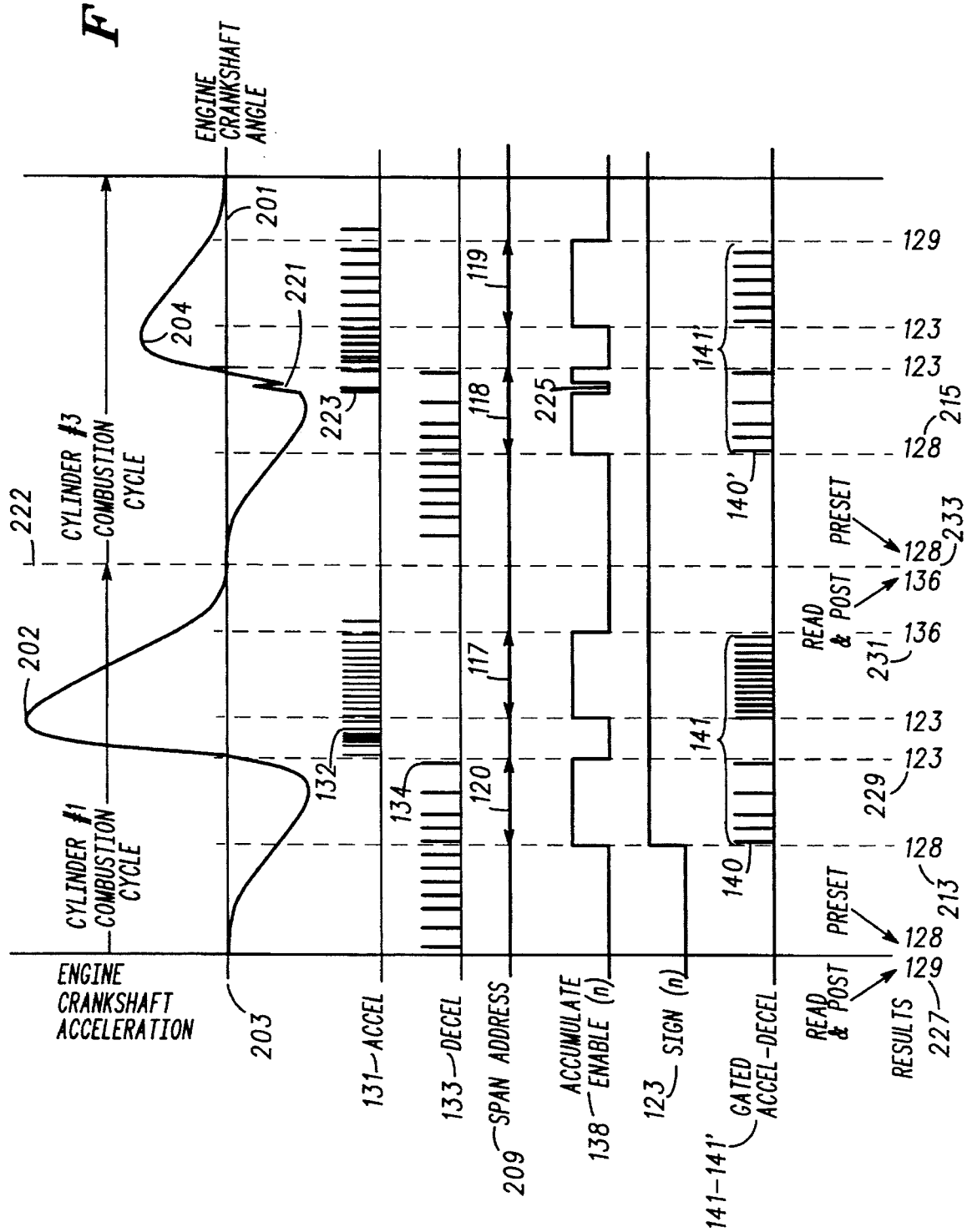
FIG. 2 is a chart of waveforms associated with operation of the apparatus shown in FIG. 1.

FIG. 2 is a chart of waveforms associated with operation of the apparatus shown in FIG. 1 under the control of method steps similar to those shown in FIG. 3. Specifically, an example of engine crankshaft acceleration 203 is shown for two adjacent cylinders in a four cylinder four stroke engine, over a half of an engine revolution—or 360° of crankshaft rotation. The reference line 222 demarcates the individual cylinder performance. Where a portion of the waveform 203 falls below a reference line 201 the engine crankshaft is decelerating, and where a portion of the waveform is positioned above the reference line 201 the engine crankshaft is accelerating. The engine crankshaft acceleration 203 waveform shows that the acceleration produced from torque associated with the combustion process for cylinder #1, shown at reference number 202 is greater than the acceleration produced from torque associated with the combustion process for cylinder #3, shown at reference number 204. This may be an indication of an improper firing of cylinder #3. So, in this example the engine's combustion performance will be measured between cylinder #1 and cylinder #3.

Returning to the chart description, the ACCEL 131 and DECEL 133 signals corresponding to the engine crankshaft acceleration waveform 203 are also positioned on the chart. Notice here that the transitions 132 and 134 of the ACCEL 131 and DECEL 133 signals are derived from the teeth of the multi-toothed wheel 101 by the measurement circuit 129. The transitions 132 and 134 of the ACCEL 131 and DECEL 133 signals actually correspond to the rate-multiplied filtered signal 116 described in the above discussion regarding the measurement device 129.

For reference purposes, a span address 209 is reproduced here in FIG. 2 with reference to the waveform 203. This span address represents the four physical span addresses 120, 117, 118, and 119 shown in reference to the multi-toothed wheel 101 in FIG. 1. Note that the above-mentioned first span corresponds to physical spans 120 and 117, and the above mentioned second span corresponds to physical spans 118 and 119. Each of the span address represent approximately 45° of rotation of the multi-toothed wheel 101.

Next, an accumulate enable flag pattern is shown corresponding to the two above-described combustion cycles. Here the accumulate enable flag 138, ACCUMULATE ENABLE (n) has been programmed (in step 305 of routine 300 shown in FIG. 3) to the first state corresponding to the multi-toothed wheel's 101 position associated with the span 120 of rotary position. The accumulate enable flag 138, ACCUMULATE ENABLE (n) has been programmed to the first state during a another span associated with physical span address 117. This pattern is, mostly, repeated for cylinder #3 in association with the span addresses of 118 and 119. However, during span 118 the accumulate enable flag 138, ACCUMULATE ENABLE (n) has been programmed to a second state as shown by reference number 225. This is to eliminate any effect from system noise, shown on the engine crankshaft acceleration waveform 203 at reference number 221, and the ACCEL waveform 131, at reference number 223. As mentioned above, system designers can characterize various system related noise patterns. This technique can mask out any effect the predictable noise has on the measurement process. Note, as mentioned above that the programming of the accumulate enable flag 138 ACCUMULATE ENABLE (n) is performed to gate the accumulate process. To this end all other accumulate enable flag's associated with the accumulate enable circuit 138 programming are programmed to the second state.

Continuing; the sign flag 123 SIGN (n) is also shown corresponding to the two above-described combustion cycles. Here, the sign flag 123 SIGN (n) has been programmed (in step 303 of routine 300 shown in FIG. 3) to the first state corresponding to the multi-toothed wheel's 101 position associated with the span 120. This pattern is, mostly, repeated for cylinder #3 in association with the span addresses of 118. Notably, the sign flag 123 SIGN (n) in associated with spans 117 and 119, and all other positions associated with the multi-toothed wheel 101 is programmed to the second state.

Next, the gated ACCEL-DECEL signals 141 and 141' are shown. Note that for the signals 141 and 141' are provided by the gating circuit 139 in direct correspondence with the accumulate enable flag 138 ACCUMULATE ENABLE (n) and both of the transitions 132 and 134 of the ACCEL 131 and DECEL 133 signals.

Now that the various signals have been introduced the results will be examined. As described above, in the discussion regarding the method steps in FIG. 3, when the multi-toothed wheel 101 is positioned 90° before TDC of a particular cylinder, here cylinder #1, a result 149 from the accumulation circuit 143 is read and posted to external knock, misfire, and combustion determination modules. Here, at reference number 227, the result 149 is 129. This happens at the commencement of the engine crankshaft acceleration waveform 203 in FIG. 2. Then, the accumulation circuit 143 is preset to an initial condition. Here, the initial condition is a value of 128. This in-effect preconditions the accumulation circuit 143 to be prepared to receive gated ACCEL-DECEL signals 141 and 141' associated with the positional behavior of cylinder #1. Although the positional behavior associated with cylinder # 1 yields a decelerating behavior pattern as indicated by waveforms 203 and 133, since the accumulate enable flag 138 ACCUMULATE ENABLE (n) corresponding to these positions is programmed to the second state, no gated ACCEL-DECEL signal 141 are produced and the result 149 of the accumulation circuit 143 remains at 128, as shown at reference number 213.

During the span address of 120, or the compression cycle of cylinder # 1, the accumulation circuit 143 accumulates in a negative direction—reducing the result 149 from 128 to 123, as shown at reference number 229. This is because the sign flag 123 SIGN (n) associated with span address 120 is programmed to the first logical state and transitions 134 of the DECEL signal 133 were provided by the gating means 139, to a count input 147 of the accumulation circuit 143.

Then, during the span address 117, or the expansion cycle of cylinder #1, the accumulation circuit 143 accumulates in a positive direction—increasing the result 149 from 123 to 136. This is because the sign flag 123 SIGN (n) associated with span address 120 is programmed to the second logical state and transitions 132 of the ACCEL signal 131 were provided to the accumulation circuit 143. This is illustrated at reference number 231.

As described above, in the discussion regarding the method steps in FIG. 3, when the multi-toothed wheel 101 is positioned 90° after TDC of cylinder #1, the result 149 from the accumulation circuit 143 is read and posted to external knock, misfire, and combustion determination modules. Here, at reference number 233, the result 149 is 136. This also happens to be at the commencement of cylinder #3's combustion cycle. Then, the accumulation circuit 143 is again preset to the initial condition, here 128. This preconditions the accumulation circuit 143 to be prepared to receive another gated ACCEL-DECEL signal 141' associated with the positional behavior of cylinder #3.

During the span address of 118, or the compression cycle of cylinder #3, the accumulation circuit 143 again accumulates in a negative direction—reducing the result 149 from 128 to 123, as shown at reference number 229. Note that during the second span address, corresponding to spans 118 and 119, another accumulation direction flag 127, which could be thought of as 127', is provided to the accumulation circuit 143. This another accumulation direction flag 127' is again determined in response to the sign flag 123 SIGN (n) associated with span address 118, which here is programmed to the first logical state. Because of this, and because transitions 134 of the DECEL signal 133 were provided by the .gating means 139, to the accumulation circuit 143 the accumulation circuit 143 accumulates in the negative direction.

Then, during the span address 119, or the expansion cycle of cylinder #3, the accumulation circuit 143 accumulates in a positive direction—thereby providing another result 149' 129 increased from 123. This is because the sign flag 123 SIGN (n) associated with span address 119 is programmed to the second logical state and transitions 132 of the ACCEL signal 131 were provided to the accumulation circuit 143. Finally, the another result 129 is read as shown at reference number 227. Next, a couple more examples will be detailed.

A brief example of how this apparatus can be applied to determine misfire follows. This explains how the apparatus can be programmed to consider spans of rotary position of the multi-toothed wheel 101 positioned within a same revolution of the multi-toothed wheel 101.

To use the system to detect misfire, four spans 120, 117, 118, 119 would be identified similar to those shown in FIG. 2. The accumulate enable circuit 135 would be programmed so that the ACCUMULATE ENABLE (n) signal 138 allows accumulation in two spans symmetrical around TDC for every cylinder (120 and 117 for cylinder 1 and 118 and 119 for cylinder 3) as shown in FIG. 2. Before the beginning of each cylinder cycle, the result 211 is read, using data path 149, from the accumulation circuit 143 and then preset 213 to a median value of 128. In addition the sign flag SIGN (n) 123 is programmed so that accumulation of the ACCEL transitions 132 in the first span 120 is in the positive direction and that ACCEL transitions 132 in the second span 117 is in the negative direction whereby the result 215 from the accumulation circuit 143 is the difference between the average acceleration during the first span 120 and the second span 117 for cylinder 1. This result (value 136 for cylinder 1 and 129 for cylinder 3) is averaged with previous results from the same test and cylinder. After several engine cycles the results for the cylinders can be compared against each other to determine likelihood of misfire. If all cylinders produced result 211 of value 136 except for cylinder 3 with value 129 for several engine cycles, a misfire of cylinder 3 would be indicated.

To use the same system for compression testing only the first span for each cylinder 120 for cylinder 1 and 118 for cylinder 3 would be used. This explains how the apparatus can be programmed to consider spans of rotary position of the multi-toothed wheel 101 positioned within different revolutions of the multi-toothed wheel 101. In this example the spans are positioned corresponding to adjacent firings of a cylinder.

The ACCUMULATE ENABLE (n) 138 would be programmed so that the accumulation means 143 would not accumulate ACCEL 132 or DECEL 134 transitions during the spans 117 and 119 the results 211 value 123 for cylinder 1 and value 123 for cylinder 3 would be different if cylinder 3 had a compression problem. Again the values for each cylinder would be averaged over several engine cycles and compared against each other. In this case higher values would indicate compression problem.

In conclusion, an improved apparatus and method for measuring reciprocating engine performance dependent on positional behavior of a rotating member has been detailed above. This architecture may be easily integrated onto an application specific integrated circuit in a relatively small area. Since all real-time computations are carried out in this application specific hardware, the microcontroller can concentrate on executing the engine strategy rather than attending to the lower level high bandwidth demanding task of analyzing the real-time positional behavior of a rotating member. Its only involvement in the process is to program the apparatus and read and interpret the results. This significantly off-loads the microcontroller only demanding intervention at a substantially lower bandwidth than in prior art structures. Also, this architecture is less complex than prior an schemes making it simpler to program.

What is claimed is:

1. An apparatus for measuring reciprocating engine performance dependent on torque output of the reciprocating engine, where the torque output is measured by observing positional behavior of a rotating member driven by the reciprocating engine, said apparatus comprising:

measurement means for providing an acceleration signal indicative of acceleration of said rotating member;

gated ACCEL-DECEL means for providing a gated acceleration signal, dependent on the acceleration signal gated by an accumulate enable flag corresponding to a first span of rotary position of said rotating member; and accumulation means for accumulating the gated acceleration signal, and for providing an accumulated result dependent thereon.

2. An apparatus in accordance with claim 1, wherein said accumulation means further comprises a preset input for receiving an initial condition, and wherein said accumulation means provides the accumulated result, by accumulating the gated ACCEL-DECEL signal dependent on the received initial condition.

3. An apparatus in accordance with claim 2, wherein the received initial condition has a value median within a span of values associated with said accumulation means.

4. An apparatus in accordance with claim 1, wherein said gated ACCEL-DECEL means provides another gated acceleration signal dependent on the acceleration signal gated by another accumulate enable flag corresponding to a second span positioned separate from the first span of rotary position of said rotating member, wherein said gated ACCEL-DECEL means provides another gated ACCEL-DECEL signal, and wherein said accumulation means accumulates the another gated ACCEL-DECEL signal and provides another accumulated result dependent thereon.

5. An apparatus in accordance with claim 4 further comprising deterministic means for providing a composite result indicating performance of said reciprocating engine dependent on the accumulated result, and the another accumulated result each result associated with engine performance between the first and second spans respectively.

6. An apparatus in accordance with claim 5 where the first and second spans are positioned within a same revolution of said rotating member.

7. An apparatus in accordance with claim 5 where the first and second spans are positioned within different revolutions of said rotating member.

8. An apparatus in accordance with claim 7 where the first and second spans are positioned within revolutions of said rotating member are positioned corresponding to adjacent firings of a cylinder respectively.

9. An apparatus for measuring reciprocating engine performance dependent on torque output of the reciprocating engine, where the torque output is measured by observing positional behavior of a rotating member driven by the reciprocating engine, said apparatus comprising:

measurement means for providing an ACCEL signal, and a DECEL signal, wherein transitions of the ACCEL signal are indicative of acceleration of said rotating member, and transitions of the DECEL signal are indicative of deceleration of said rotating member;

accumulation direction means for providing an accumulation direction flag dependent on transitions of one of the ACCEL signal and the DECEL signal, each signal provided corresponding to a first span of rotary position of said rotating member;

gated ACCEL-DECEL means for providing a gated ACCEL-DECEL signal, wherein accumulation transitions of said gated ACCEL-DECEL signal are dependent on the transitions of the ACCEL signal and the transitions of the DECEL signal, each provided corresponding to the first span of rotary position of said rotating member; and accumulation means for accumulating each of the accumulation transitions of the gated ACCEL-DECEL signal dependent on the accumulation direction flag, and for providing an accumulated result dependent thereon.

10. An apparatus in accordance with claim 9, wherein said accumulation means further comprises a preset input for receiving an initial condition, and wherein said accumulation means provides the accumulated result, by accumulating each of the accumulation transitions of the gated ACCEL-DECEL signal dependent on the accumulation direction flag, and the received initial condition.

11. An apparatus in accordance with claim 10, wherein the received initial condition has a value median within a span of said accumulation means.

12. An apparatus in accordance with claim 9, wherein said accumulation direction means provides another accumulation direction flag dependent on transitions of one of the ACCEL signal and the DECEL signal, each signal provided corresponding to a second span positioned separate from the first span of rotary position of said rotating member, wherein said gated ACCEL-DECEL means provides another gated ACCEL-DECEL signal, wherein other accumulation transitions of said another gated ACCEL-DECEL signal are dependent on the transitions of the ACCEL signal and the transitions of the DECEL signal, each provided corresponding to the second span of rotary position of said rotating member, and wherein said accumulation means accumulates each of the other accumulation transitions of the another gated ACCEL-DECEL signal dependent on the another accumulation direction flag, and provides another accumulated result dependent thereon.

13. An apparatus in accordance with claim 12 further comprising deterministic means for providing a composite result indicating performance of said reciprocating engine dependent on the accumulated result, and the another accumulated result each result associated with engine performance between the first and second spans respectively.

14. An apparatus in accordance with claim 13 where the first and second spans are positioned within a same revolution of said rotating member.

15. An apparatus in accordance with claim 13 where the first and second spans are positioned within different revolutions of said rotating member.

16. An apparatus in accordance with claim 15 where the first and second spans are positioned within revolutions of said rotating member are positioned corresponding to adjacent firings of a cylinder respectively.

17. An apparatus for measuring reciprocating engine performance dependent on torque output of the reciprocating engine, where the torque output is measured by observing positional behavior of a rotating member driven by the reciprocating engine, said apparatus comprising:

measurement means for providing an ACCEL signal, and a DECEL signal, wherein transitions of the ACCEL signal are indicative of acceleration of said rotating member, and transitions of the DECEL signal are indicative of deceleration of said rotating member;

sign means for providing a sign flag corresponding to a first span of rotary position of said rotating member;

combining means for combining the sign flag provided by said sign means and transitions of one of the ACCEL signal and the DECEL signal, and in response thereto for providing an accumulation direction flag accumulate enable means for providing an accumulate enable flag corresponding to the first span of rotary position of said rotating member;

gating means for providing a gated ACCEL-DECEL signal having accumulation transitions dependent on the transitions of the ACCEL signal and the transitions of the DECEL signal gated by the accumulate enable flag; and accumulation means for providing an accumulated result dependent on the accumulation direction flag and accumulation of each of the accumulation transitions of the gated ACCEL-DECEL signal.

18. An apparatus in accordance with claim 17, wherein said accumulation means further comprises means for receiving an initial condition, and wherein said accumulation means provides the accumulated result, dependent on the initial condition, the accumulation direction flag and accumulation of each of the accumulation transitions of the gated ACCEL-DECEL signal.

19. An apparatus in accordance with claim 17, wherein the accumulation direction flag provided by said combining means comprises more than one logical state, and the sign flag provided by said sign means comprises more than one logical state, and wherein responsive to a first logical state of the sign flag, and receipt of the transitions of the DECEL signal said combining means provides a first logical state of the accumulation direction flag of the more than one logical state, and responsive thereto said accumulation means accumulates in a positive direction.

20. An apparatus in accordance with claim 19, wherein responsive to a second logical state of the sign flag, and receipt of the transitions of the DECEL signal, said combining means provides a second logical state of the accumulation direction flag, and responsive thereto said accumulation means accumulates in a negative direction.

21. An apparatus in accordance with claim 17, wherein the accumulation direction flag provided by said combining means comprises more than one logical state, and the sign flag provided by said sign means comprises more than one logical state, and wherein responsive to a first logical state of the sign flag, and receipt of the transitions of the ACCEL signal said combining means provides a second logical state of the accumulation direction flag of the more than one logical state, and responsive thereto said accumulation means accumulates in a negative direction.

22. An apparatus in accordance with claim 21, wherein responsive to a second logical state of the sign flag, and receipt of the transitions of the ACCEL signal, said combining means provides a first logical state of the accumulation direction flag, and responsive thereto said accumulation means accumulates in a positive direction.

23. An apparatus in accordance with claim 17, wherein the accumulate enable flag provided by said accumulate enable means comprises more than one logical state, and wherein responsive to a first logical state of the accumulate enable flag, and in receipt of the transitions of the ACCEL signal and the transitions of the DECEL signal, said gating means provides the gated ACCEL-DECEL signal having accumulation transitions to said accumulation means.

24. An apparatus in accordance with claim 23, wherein responsive to a second logical state of the accumulate enable flag said gating means prevents the provision of the accumulation transitions associated with the transitions of the ACCEL signal and the transitions of the DECEL signal, to said accumulation means.

25. An apparatus in accordance with claim 17, wherein said combining means provides another accumulation direction flag dependent on transitions of one of the ACCEL signal and the DECEL signal, each signal provided corresponding to a second span positioned separate from the first span of rotary position of said rotating member, wherein said gating means provides another gated ACCEL-DECEL signal, wherein other accumulation transitions of said another gated ACCEL-DECEL signal are dependent on the transitions of the ACCEL signal and the transitions of the DECEL signal, each provided corresponding to the second span of rotary position of said rotating member, and wherein said accumulation means accumulates each of the other accumulation transitions of the another gated ACCEL-DECEL signal dependent on the another accumulation direction flag, and provides another accumulated result dependent thereon.

26. An apparatus in accordance with claim 25 further comprising deterministic means for providing a composite result indicating performance of said reciprocating engine dependent on the accumulated result, and the another accumulated result each result associated with engine performance between the first and second spans of rotary position of said rotating member respectively.

27. An apparatus in accordance with claim 26 where the first and second spans are positioned within a same revolution of said rotating member.

28. An apparatus in accordance with claim 26 where the first and second spans are positioned within different revolutions of said rotating member.

29. An apparatus in accordance with claim 28 where the first and second spans are positioned corresponding to adjacent firings of a cylinder respectively.

30. An integrated circuit for measuring reciprocating engine performance dependent on positional behavior of a multi-toothed wheel having a multitude of teeth, where the multi-toothed wheel is driven by the reciprocating engine, and the positional behavior is measured by a positional encoder that provides a filtered signal indicative of acceleration and deceleration of said multi-toothed wheel, said integrated circuit comprising:

an ACCEL-DECEL circuit having an input for receiving the filtered signal from said positional encoder, and for providing an ACCEL signal, and a DECEL signal, wherein transitions of the ACCEL signal are indicative of acceleration of said multi-toothed wheel, and transitions of the DECEL signal are indicative of deceleration of said multi-toothed wheel;

a sign circuit for providing a sign flag corresponding to a first span of rotary position of said multi-toothed wheel;

a combining circuit for combining the sign flag provided by said sign circuit and transitions of one of the ACCEL signal and the DECEL signal, and in response thereto for providing an accumulation direction flag;

accumulate enable circuit for providing an accumulate enable flag corresponding to the first span of rotary position of said multi-toothed wheel;

a gating circuit, coupled to ACCEL-DECEL circuit and said accumulate enable circuit, said gating circuit for providing a gated ACCEL-DECEL signal having accumulation transitions dependent on the transitions of the ACCEL signal and the transitions of the DECEL signal gated by the accumulate enable flag and a presettable counter having an accumulation direction input for receiving the accumulation direction flag provided by said combining circuit, and a count input for receiving the gated ACCEL-DECEL signal provided by said gating circuit, wherein said accumulation circuit provides an accumulated result, dependent on the accumulation direction flag and accumulation of each of the accumulation transitions of the gated ACCEL-DECEL signal at the count input.

31. A method for measuring reciprocating engine performance dependent on torque output of the reciprocating engine, where the torque output is measured by observing positional behavior of a rotating member driven by the reciprocating engine, said method comprising the steps of:

providing an acceleration signal indicative of acceleration of said rotating member;

providing a gated acceleration signal, dependent on the acceleration signal gated by an accumulate enable flag corresponding to a first span of rotary position of said rotating member; and accumulating the gated acceleration signal, and for providing an accumulated result dependent thereon.

32. A method in accordance with claim 31 further comprising a step of receiving an initial condition; and wherein said step of accumulating provides the accumulated result, by accumulating the gated acceleration signal dependent on the received initial condition.

33. A method in accordance with claim 31 further comprising the steps of:

providing another gated acceleration signal dependent on the acceleration signal gated by another accumulate enable flag corresponding to a second span positioned separate from the first span of rotary position of said rotating member; and wherein said step of accumulating accumulates the another gated ACCEL-DECEL signal and provides another accumulated result dependent thereon.

34. A method in accordance with claim 33 further comprising a step of providing a composite result indicating performance of said reciprocating engine dependent on the accumulated result, and the another accumulated result each result associated with engine performance between the first and second spans respectively.

35. A method in accordance with claim 33 where the first and second spans are positioned within a same revolution of said rotating member.

36. A method in accordance with claim 33 where the first and second spans are positioned within different revolutions of said rotating member.

37. A method in accordance with claim 36 where the first and second spans are positioned within revolutions of said rotating member are positioned corresponding to adjacent firings of a cylinder respectively.

38. A method for measuring reciprocating engine performance dependent on torque output of the reciprocating engine, where the torque output is measured by observing positional behavior of a rotating member driven by the reciprocating engine, said method comprising the steps of:

providing an ACCEL signal, and a DECEL signal, wherein transitions of the ACCEL signal are indicative of acceleration of said rotating member, and transitions of the DECEL signal are indicative of deceleration of said rotating member;

providing an accumulation direction flag dependent on transitions of one of the ACCEL signal and the DECEL signal, each signal provided corresponding to a first span of rotary position of said rotating member;

providing a gated ACCEL-DECEL signal, wherein accumulation transitions of said gated ACCEL-DECEL signal are dependent on the transitions of the ACCEL signal and the transitions of the DECEL signal, each provided corresponding to the first span of rotary position of said rotating member; and accumulating each of the accumulation transitions of the gated ACCEL-DECEL signal dependent on the accumulation direction flag, and providing an accumulated result dependent thereon.

39. A method in accordance with claim 38, wherein said step of accumulating further comprises a step of receiving an initial condition, and wherein said step of accumulating provides the accumulated result, by accumulating each of the accumulation transitions of the gated ACCEL-DECEL signal dependent on the accumulation direction flag, and the received initial condition.

40. A method in accordance with claim 38, further comprising the steps of:

providing another accumulation direction flag dependent on transitions of one of the ACCEL signal and the DECEL signal, each signal provided corresponding to a second span positioned separate from the first span of rotary position of said rotating member;

providing another gated ACCEL-DECEL signal, wherein other accumulation transitions of said gated ACCEL-DECEL signal are dependent on the transitions of the ACCEL signal and the transitions of the DECEL signal, each provided corresponding to the second span of rotary position of said rotating member; and wherein said step of accumulating accumulates each of the other accumulation transitions of the another gated ACCEL-DECEL signal dependent on the another accumulation direction flag, and providing another accumulated result dependent thereon.

41. A method in accordance with claim 38 further comprises a step of providing a composite result indicating performance of said reciprocating engine dependent on the accumulated result, and the another accumulated result each result associated with engine performance between the first and second spans of rotary position of said rotating member respectively.

42. A method in accordance with claim 38 where the first and second spans are positioned within a same revolution of said rotating member.

43. A method in accordance with claim 38 where the first and second spans are positioned within different revolutions of said rotating member.

44. A method in accordance with claim 40 where the first and second spans are positioned corresponding to adjacent firings of a cylinder respectively.

* * * * *